United States Patent
Higgins et al.

(10) Patent No.: US 10,607,445 B2
(45) Date of Patent: Mar. 31, 2020

(54) SYSTEM AND METHOD FOR PROVIDING FINANCIAL ACCOUNT REWARDS PROGRAMS

(71) Applicant: IGT, Las Vegas, NV (US)

(72) Inventors: Kevin Higgins, Reno, NV (US);
Jeffery Shepherd, Reno, NV (US);
Dwayne A. Davis, Reno, NV (US);
Andrew Fisher, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1 day.

(21) Appl. No.: 16/031,045

(22) Filed: Jul. 10, 2018

(65) Prior Publication Data

US 2020/0020199 A1    Jan. 16, 2020

(51) Int. Cl.
*G07F 17/32* (2006.01)
*G06Q 30/02* (2012.01)

(52) U.S. Cl.
CPC ..... *G07F 17/3255* (2013.01); *G06Q 30/0212* (2013.01); *G06Q 30/0226* (2013.01); *G06Q 30/0238* (2013.01); *G07F 17/3211* (2013.01); *G07F 17/3258* (2013.01)

(58) Field of Classification Search
USPC .......................................................... 463/27
See application file for complete search history.

(56) References Cited

U.S. PATENT DOCUMENTS

| | | |
|---|---|---|
| 5,774,870 A | 6/1998 | Storey |
| 5,779,549 A | 7/1998 | Walker et al. |
| 5,823,879 A | 10/1998 | Goldberg et al. |
| 6,028,920 A | 2/2000 | Carson |
| 6,061,660 A | 5/2000 | Eggleston et al. |
| 6,578,735 B1 | 6/2003 | Mothwurf |
| 6,656,050 B2 | 12/2003 | Busch et al. |
| 7,025,674 B2 | 4/2006 | Adams et al. |
| 7,052,393 B1 | 5/2006 | Schoen |
| 7,168,616 B2 | 1/2007 | Carnation |
| 7,316,614 B2 | 1/2008 | Dietz et al. |
| 7,736,226 B1 | 6/2010 | Luciano, Jr. |
| 8,448,537 B2 | 5/2013 | Nagaoka et al. |
| 8,449,388 B2 | 5/2013 | Nicely et al. |
| 8,585,494 B2 | 11/2013 | Parrinello et al. |
| 9,257,010 B2 | 2/2016 | Jhanb et al. |
| 9,342,956 B2 | 5/2016 | Hughes |
| 9,640,018 B2 | 5/2017 | Finocchio et al. |
| 9,685,039 B2 | 6/2017 | Evans |
| 9,799,167 B2 | 10/2017 | Pawloski et al. |
| 9,842,345 B2 | 12/2017 | Ariff et al. |
| 9,990,642 B2 | 6/2018 | Strock et al. |

(Continued)

FOREIGN PATENT DOCUMENTS

| | | |
|---|---|---|
| JP | 05250568 | 9/1993 |
| JP | 08249396 | 9/1996 |

(Continued)

*Primary Examiner* — Pierre E Elisca
(74) *Attorney, Agent, or Firm* — Neal, Gerber & Eisenberg LLP

(57) ABSTRACT

The present disclosure relates generally to a system that provides zero, one or more benefits to a consumer in association with the consumer utilizing an instrument associated with a qualifying financial account to purchase goods and/or services, wherein an amount of any benefits may be disproportionate to the value of the purchased goods and/or services.

19 Claims, 5 Drawing Sheets

(56) References Cited

U.S. PATENT DOCUMENTS

| | | |
|---|---|---|
| 2001/0039511 A1 | 11/2001 | Duckworth et al. |
| 2001/0050311 A1 | 12/2001 | Avellino |
| 2002/0107074 A1 | 8/2002 | Lee |
| 2002/0111918 A1 | 8/2002 | Hoshino et al. |
| 2003/0057274 A1 | 3/2003 | Dawson |
| 2003/0061098 A1 | 3/2003 | Meyer |
| 2003/0115102 A1 | 6/2003 | Mothwurf |
| 2003/0233278 A1 | 12/2003 | Marshall |
| 2004/0010447 A1 | 1/2004 | Asayama |
| 2004/0143502 A1 | 7/2004 | McClung, III |
| 2004/0158489 A1 | 8/2004 | Rogers |
| 2004/0169088 A1 | 9/2004 | Nelms et al. |
| 2004/0181450 A1 | 9/2004 | Yamada et al. |
| 2005/0021457 A1 | 1/2005 | Johnson et al. |
| 2005/0033642 A1 | 2/2005 | Mothwurf |
| 2005/0149393 A1 | 7/2005 | Leof |
| 2006/0229946 A1 | 10/2006 | Scroggie et al. |
| 2006/0249897 A1 | 11/2006 | Jubinville et al. |
| 2006/0259361 A1 | 11/2006 | Barhydt et al. |
| 2008/0194311 A1 | 8/2008 | Cage et al. |
| 2008/0215423 A1 | 9/2008 | Kim |
| 2009/0209331 A1* | 8/2009 | Soukup .................. G07F 17/32 463/27 |
| 2009/0287570 A1 | 11/2009 | Adamousky et al. |
| 2010/0062843 A1* | 3/2010 | Gagner ............... G07F 17/3202 463/27 |
| 2010/0240448 A1* | 9/2010 | Keenan .................. G07F 17/32 463/27 |
| 2011/0212766 A1* | 9/2011 | Bowers .................. G07F 17/32 463/25 |
| 2013/0316784 A1* | 11/2013 | Coleman ................ G07F 17/32 463/19 |
| 2013/0331172 A1* | 12/2013 | Olsen ................. G07F 17/3244 463/20 |
| 2014/0274314 A1 | 9/2014 | Cage et al. |

FOREIGN PATENT DOCUMENTS

| | | |
|---|---|---|
| JP | 2002373303 | 12/2002 |
| JP | 2003248772 | 9/2003 |
| JP | 2004013601 | 1/2004 |
| JP | 2004094470 | 3/2004 |
| KR | 2002022824 | 3/2002 |

* cited by examiner

US 10,607,445 B2

SYSTEM AND METHOD FOR PROVIDING FINANCIAL ACCOUNT REWARDS PROGRAMS

BACKGROUND

Certain credit card rewards programs enable members to earn rewards of some form that accumulate at a percentage of the amount spent using their credit cards. For example, a consumer may earn 1% cashback on all retail purchases made using a credit card affiliated with that credit card rewards program. In another example, a consumer may earn points on retail purchases made using a credit card affiliated with that credit card rewards program. In this example, once a certain threshold of points is reached, the points can be redeemed for a free plane ticket or other goods. While such credit card rewards programs are popular with consumers, the rewards provided to a consumer are proportional to the amount that the consumer spends.

SUMMARY

In certain embodiments, the present disclosure relates to a system including a processor, and a memory device which stores a plurality of instructions, which when executed by the processor, cause the processor to maintain a progressive award pool, and randomly determine a progressive award triggering event associated with the progressive award pool. When executed by the processor responsive to receiving data of an approved purchase associated with a financial account maintained by a financial institution, the instructions cause the processor to increment the progressive award pool based on a purchase contribution rate associated with the progressive award pool and an amount of the approved purchase. Additionally, when executed by the processor responsive to the approved purchase being associated with an occurrence of the randomly determined progressive award triggering event, the instructions cause the processor to determine, based on the incremented progressive award pool, an amount of a progressive award, and cause the amount of the progressive award to be provided to a customer associated with the financial account.

In certain embodiments, the present disclosure relates to a system including a processor, and a memory device which stores a plurality of instructions, which when executed by the processor, cause the processor to maintain a progressive award pool, and randomly determine a progressive award triggering event associated with the progressive award pool. When executed by the processor responsive to receiving data of an approved purchase associated with a financial account maintained by a financial institution, the instructions cause the processor to increment the progressive award pool based on a purchase contribution rate associated with the progressive award pool and an amount of the approved purchase. Additionally, when executed by the processor responsive to the approved purchase being associated with an occurrence of the randomly determined progressive award triggering event, the instructions cause the processor to determine, based on the incremented progressive award pool, an amount of a progressive award, associate a game entry with the determined amount of the progressive award, and cause a customer associated with the approved purchase to be provided the game entry.

In certain embodiments, the present disclosure relates to a system including a processor, and a memory device which stores a plurality of instructions, which when executed by the processor, cause the processor to: maintain a progressive award pool associated with a plurality of credit card accounts, and randomly determine a progressive award triggering event associated with the progressive award pool. When executed by the processor responsive to receiving data of an approved retail purchase associated with one of the credit card accounts occurring at a point-of-sale terminal, the instructions cause the processor to increment the progressive award pool based on a purchase contribution rate associated with the progressive award pool and an amount of the approved retail purchase. Additionally, when executed by the processor responsive to the approved retail purchase being associated with an occurrence of the randomly determined progressive award triggering event, the instructions cause the processor to: determine, based on the incremented progressive award pool, an amount of a progressive award, communicate data which results in a display device associated with the point-of-sale terminal displaying the amount of the progressive award, and communicate fund transfer data which results in the amount of the progressive award being associated with the credit card account associated with the approved retail purchase.

Additional features and advantages are described herein, and will be apparent from the following Detailed Description and the figures.

DETAILED DESCRIPTION

Figure 1:
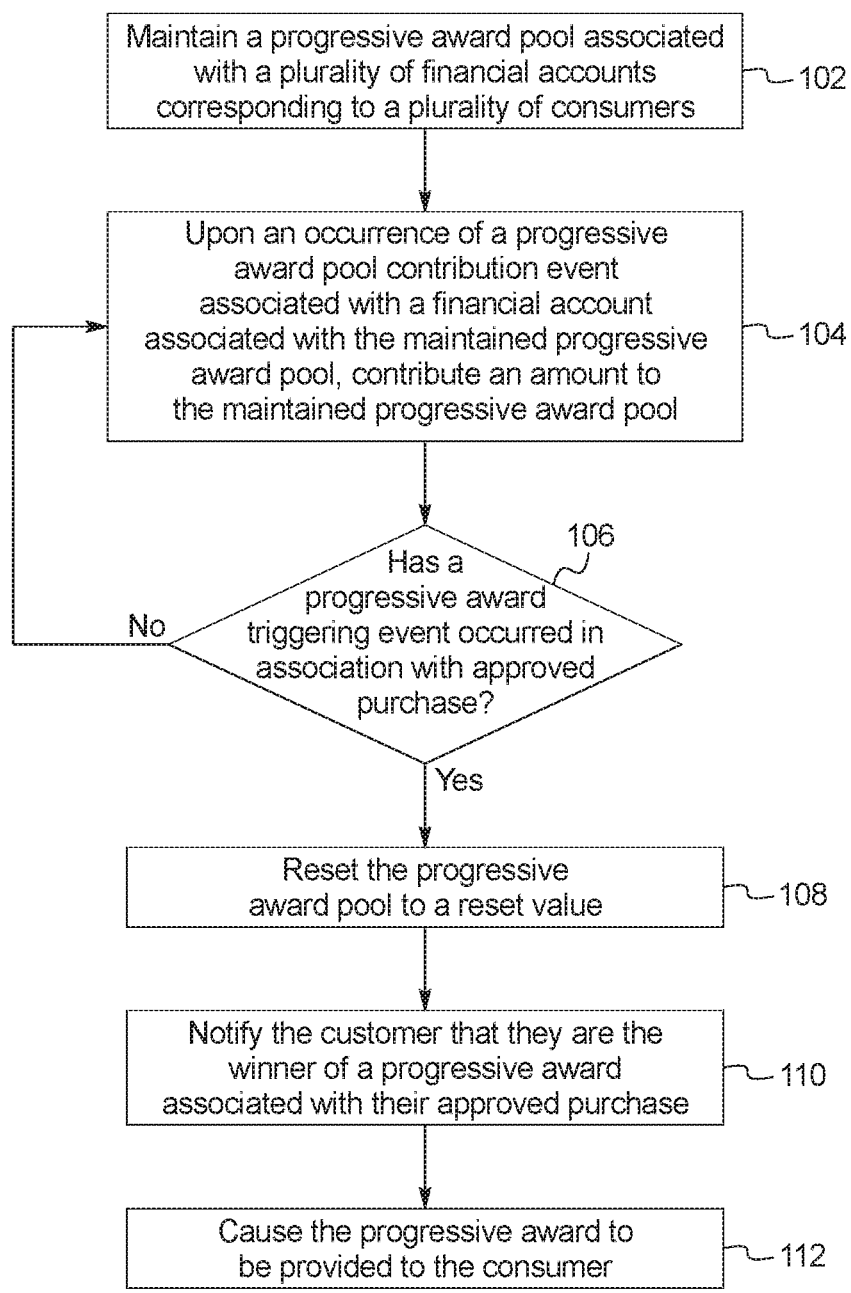
FIG. 1 is a flow chart an example process for operating a system which provides an award in association with a financial rewards incentive program wherein the award may be disproportionate to the amount the consumer spends using an instrument associated with a qualifying financial account to purchase goods and/or services.

In various embodiments, the system disclosed herein provides zero, one or more benefits to a consumer in association with the consumer utilizing an instrument associated with a qualifying financial account to purchase goods and/or services, wherein an amount of any benefits may be disproportionate to the value of the purchased goods and/or services. In these embodiments, upon a progressive award pool contribution event, such as a consumer using a qualifying financial instrument, such as a credit card or debit card, associated with a financial account to purchase goods and/or services (i.e., a qualifying retail spend), the system contributes a portion of an amount of the purchased goods and/or services to a progressive award pool. For example, if a consumer purchases $100 worth of goods using a credit card associated with a 1% rewards program, the system contributes $1 to a progressive award pool associated with each of the credit cards participating in the reward program.

Upon a progressive award triggering event, such as upon the progressive award pool reaching a randomly determined amount or after a randomly determined point in time, the system determines which purchase transaction is associated with the progressive award triggering event. The system then associates such a purchase transaction with the progressive award triggering event at the time of (or within a designated period of time of) the purchase. As such, the system of the present disclosure provides that a first set of zero, one or more qualifying purchases are associated with an occurrence of a progressive award pool contribution event but are not associated with any occurrences of a progressive award triggering event while a second set of one or more qualifying purchases are associated with both an occurrence of a progressive award pool contribution event and an occurrence of a progressive award triggering event. Following the determination of which purchase transaction is associated with the progressive award triggering event, the system either notifies the consumer that they have won part or all of the maintained progressive award pool or notifies the consumer that they may have won part or all of the maintained progressive award pool and one or more subsequent actions need to be taken by the consumer.

In certain embodiments, this notification occurs independent of any action by the consumer, such as displaying to the consumer at a point-of-sale terminal and/or sending an electronic communication (e.g., an email or short message service message), one or more messages indicating that the consumer has won the progressive award in association with their purchase transaction. For example, if a consumer purchases $200 worth of goods using a credit card associated with a 2% rewards program and the $4 contributed to a progressive award pool caused the progressive award pool to increment to a randomly determined amount of $35,888,975.15, the system causes a display device associated with the point-of-sale terminal to display a notification to the consumer that they are the lucky winner of a progressive award of $35,888,975.15 associated with their purchase.

In certain other embodiments, this notification occurs following at least one action by the consumer, such as the consumer redeeming a winning game entry associated with the purchase transaction by playing a game, such as an online game or a mobile game, wherein the predetermined award for the play of the game is part or all of the maintained progressive award pool. For example, if a consumer purchases $250 worth of goods using a credit card associated with a 2% rewards program to increment the progressive award pool to $35,888,975.15 and the system determines that the consumer's purchase was the first qualifying purchase which occurred after a randomly determined point in time, the system notifies the consumer that they have earned 500 game tickets to access 500 plays of an online game (wherein one of the game tickets is predetermined as a winning ticket associated with a progressive award of $35,888,975.15).

As such and unlike other financial account rewards programs wherein the rewards provided to a consumer are proportional to the amount that the consumer spends, the system disclosed herein provides rewards that are disproportional to the amount that the consumer spends. This configuration thus introduces an element of risk to a financial account rewards program by enabling consumers to potentially obtain life changing awards otherwise not available from existing financial account rewards programs.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, the system includes a progressive award server which maintains a progressive award pool associated with a plurality of financial accounts corresponding to a plurality of consumers as indicated in block 102 of FIG. 1. As described below, the maintained progressive award pool starts or resets at a reset amount or level and increments based on contributions associated with portions of amounts of goods and/or services purchased in association with the plurality of financial accounts.

In certain embodiments, each of the progressive award pools associated with different rewards programs have the same progressive award pool reset value. In certain embodiments, a plurality of the progressive award pools associated with different rewards programs have different progressive award pool reset values. In these embodiments, the different progressive award pool reset values are different reward program benefits associated with a customer choosing one financial account (e.g., one credit card account enrolled in one credit card rewards program) over another financial account (e.g., another credit card account enrolled in another credit card rewards program).

In certain embodiments, each of the progressive award pools associated with different rewards programs have the same purchase contribution rate (i.e., the percentage or portion of the amount of the purchase price of a good and/or service which is added to the progressive award pool). In certain embodiments, a plurality of the progressive award pools associated with different rewards programs have different purchase contribution rates. In these embodiments, the different purchase contribution rates are different reward program benefits associated with a customer choosing one financial account over another financial account. For example, a credit card which contributes 2% of the purchase price of a qualifying good and/or service to a progressive award pool may be deemed by certain customers as having a more lucrative rewards program than a credit card which contributes 1% of the purchase price of a qualifying good and/or service to a progressive award pool.

In one embodiment, the progressive award server maintains a single progressive award pool in association with a first set of financial accounts, such as credit card accounts, affiliated with a single rewards program. For example, each credit card account of Bank A that is affiliated with a mystery sweepstakes rewards program is associated with a single progressive award pool. In another embodiment, the progressive award server maintains a plurality of progressive award pools in association with a first set of financial accounts, such as credit card accounts, affiliated with a single rewards program. Such an embodiment enables multiple mystery sweepstakes to be run at the same time for the same set of financial accounts.

In another embodiment, the progressive award server maintains a single progressive award pool in association with a plurality of different sets of financial accounts, such as credit card accounts, affiliated with a plurality of different rewards programs. For example, each credit card account of Bank A that is affiliated with a mystery sweepstakes rewards program as well as each credit card account of Bank B that is affiliated with a mystery sweepstakes rewards program is associated with a single progressive award pool. In another embodiment, the progressive award server maintains a plurality of progressive award pools in association with a plurality of different sets of financial accounts, such as credit card accounts, affiliated with a plurality of different rewards programs. Such embodiments enable the progressive award pool to potentially grow in value relatively rapidly. That is, there are approximately 176,000,000 credit card accounts in the United States and the average spend per month on a credit card account associated with a rewards program is $890 per consumer. As such, if the system disclosed herein becomes associated with 10,000,000 credit card accounts (i.e., less than 6% of the total quantity of existing credit card accounts), then based on the $890 per consumer monthly credit card spend and a 1% purchase contribution rate, it would take slightly over a month (i.e., 1.12 months) for the progressive award pool to reach $100,000,000 and slightly over eleven months (i.e., 11.23 months) for the progressive award pool to reach $1,000,000,000. Accordingly, in exchange for forgoing the relatively small rewards benefits customers currently receive, the system disclosed herein provides the opportunity to win life-altering progressive awards in association with using a credit card to make one or more purchases.

In another embodiment, the progressive award server maintains a progressive award pool associated with different contribution rates based on the merchant whom sold the qualifying good and/or service (which is funded by the manufacturer of the purchased good, the provider of the purchased service, the consumer and/or a third party). For example, qualifying purchases made at a first merchant are associated with a contribution rate of 1% of the purchase price and qualifying purchases made at a second, different merchant are associated with a contribution rate of 2% of the purchase price.

In another embodiment, the progressive award server maintains a plurality of progressive award pools in association with different merchants participating in the rewards program. In this embodiment, the progressive award server maintains a first progressive award pool for a first set of merchants whom enable consumers to purchase goods and/or services using a set of financial accounts, such as credit card accounts and further maintains a second progressive award pool for a second, different set of merchants whom enable consumers to purchase goods and/or services using the set of financial accounts, such as credit card accounts. In certain such embodiments, the different progressive award pools are associated with different reset values and/or different purchase contribution rates (funded by the merchant, the consumer and/or a third party) to entice consumers to purchase the goods and/or services at one merchant over another merchant.

In another embodiment, the progressive award server maintains a progressive award pool associated with different contribution rates based on the type of qualifying good and/or service (which is funded by the manufacturer of the purchased good, the provider of the purchased service, the consumer and/or a third party). For example, qualifying purchases of a first type of qualifying good and/or service are associated with a contribution rate of 1% of the purchase price and qualifying purchases of a second, different type of qualifying good and/or service are associated with a contribution rate of 2% of the purchase price.

In another embodiment, the progressive award server maintains a plurality of progressive award pools in association with different types of qualifying purchased goods and/or services. In this embodiment, the progressive award server maintains a first progressive award pool for a first set of qualifying goods and/or services purchased using a set of financial accounts, such as credit card accounts and further maintains a second progressive award pool for a second, different set of qualifying goods and/or services purchased using the set of financial accounts, such as credit card accounts. In certain such embodiments, the different progressive award pools are associated with different reset values and/or different purchase contribution rates (funded by the manufacturer of the purchased good, the provider of the purchased service, the consumer and/or a third party) to entice consumers to purchase one type of goods and/or services over another type of goods and/or services.

In another embodiment, the progressive award server maintains a progressive award pool associated with different contribution rates based on the value amounts of qualifying purchased goods and/or services (which are funded by the manufacturer of the purchased good, the provider of the purchased service, the consumer and/or a third party). For example, qualifying purchases under $999.99 are associated with a contribution rate of 1% of the purchase price and qualifying purchases over $1000.00 are associated with a contribution rate of 2% of the purchase price.

In another embodiment, the progressive award server maintains a plurality of progressive award pools in association with different amounts of qualifying purchased goods and/or services. In this embodiment, the progressive award server maintains a first progressive award pool for qualifying goods and/or services valued within a first value range which are purchased using a set of financial accounts, such as credit card accounts and further maintains a second progressive award pool for qualifying goods and/or services valued within a second, different value range which are purchased using the set of financial accounts, such as credit card accounts. In certain such embodiments, the different progressive award pools are associated with different reset values and/or different purchase contribution rates (funded by the manufacturer of the purchased good, the provider of the purchased service, the consumer and/or a third party).

In addition to maintaining a progressive award pool, upon an occurrence of a progressive award pool contribution event associated with a financial account associated with the maintained progressive award pool, the progressive award server contributes an amount to the maintained progressive award pool as indicated in block 104.

In certain embodiments, a progressive award contribution event includes a consumer using a qualifying financial instrument, such as a credit card, associated with a financial account to purchase goods and/or services (i.e., a qualifying retail spend). In these embodiments, upon the occurrence of the progressive award contribution event, the system contributes an amount to the progressive award pool equal to a portion or percentage of an amount of the purchased goods and/or services. For example, if a consumer purchases $100 worth of goods using a credit card associated with a 1% rewards program (i.e., a 1% purchase contribution rate) at a point-of-sale terminal, the system contributes $1 to a progressive award pool associated with each of the credit cards participating in the reward program.

Figure 2A:
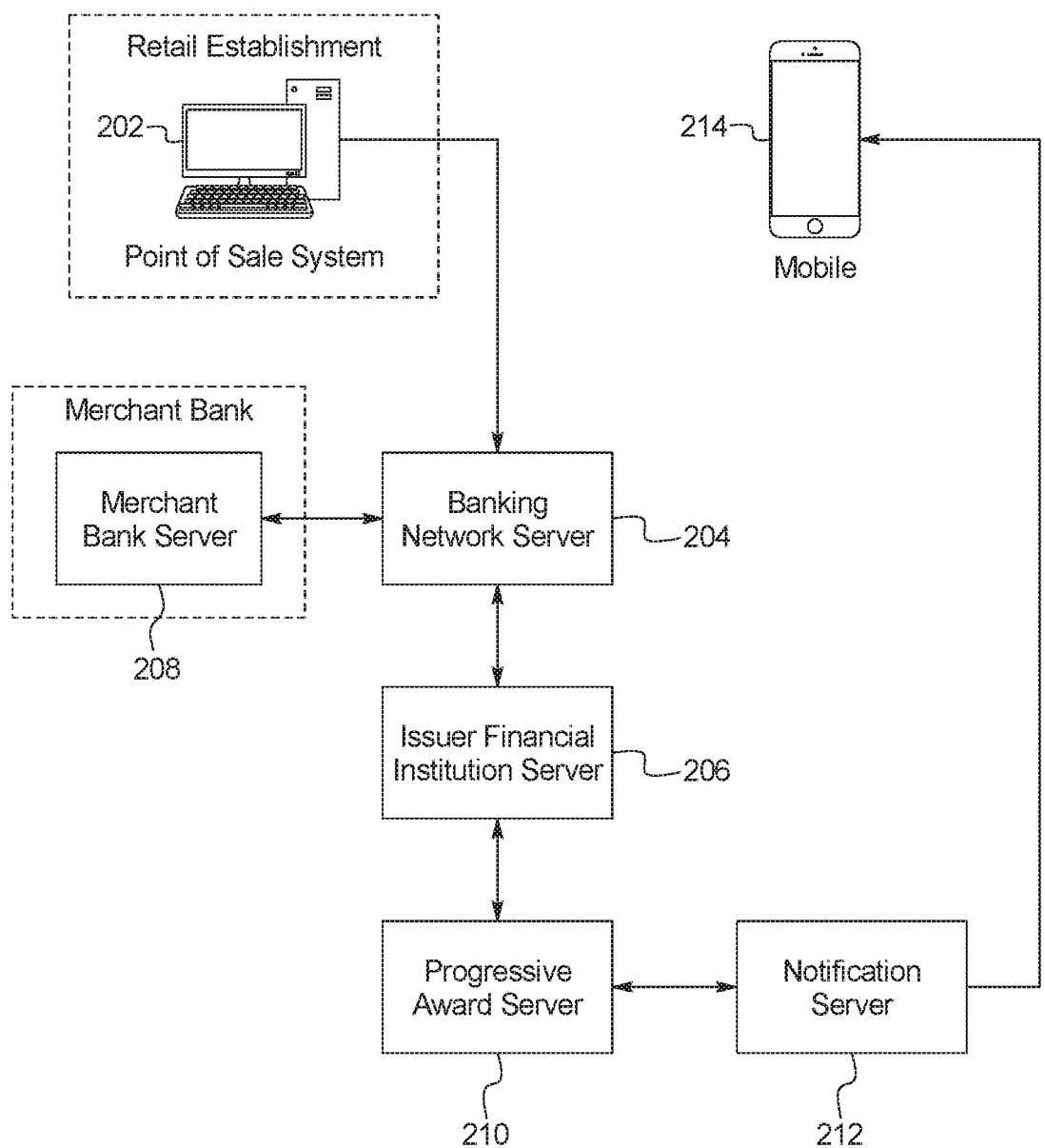
FIGS. 2A and 2B are example configurations of the architecture of a plurality of different components of the system disclosed herein.

More specifically and as described in relation to the various components of FIG. 2A, following the consumer's attempt to use a qualifying financial instrument, such as a credit card, at a point-of-sale terminal 202 in a retail establishment, the point-of-sale terminal communicates the purchase request to a banking network server 204, such as a credit card network server. The purchase request includes information associated with the attempted transaction, such as, but not limited to, the time and date of the attempted purchase, the amount of the attempted purchase, merchant identifying information, and financial account identifying information. The banking network server in turn communicates the information associated with the attempted transaction to a server of the financial institution which issued the financial instrument 206 (i.e., the issuer financial institution server), such as the issuer bank server or issuer credit union server.

The issuer financial institution server then proceeds with approving or denying the attempted purchase. If the issuer financial institution server denies the attempted purchase, such as if the issuer financial institution server detects that the transaction may be fraudulent or if the issuer financial institution server determines that the amount of the attempted purchase exceeds a credit limit associated with the financial account, the issuer financial institution server communicates a denial of the transaction to the point-of-sale terminal through the banking network server. On the other hand, if the issuer financial institution server approves the attempted purchase, the issuer financial institution server communicates an approval of the transaction to the point-of-sale terminal through the banking network server. If the issuer financial institution server approves the attempted purchase, the issuer financial institution server also updates the financial account associated with the approved purchase (i.e., to reflect the purchase) and communicates fund transfer data associated with the amount of the approved purchase to a merchant bank server 208 (i.e., a server of the financial institution associated with the retail establishment) which updates one or more financial accounts associated with the retail establishment to reflect the amount of the approved purchase.

In addition to approving or denying the attempted purchase, if the issuer financial institution server 206 approves the attempted purchase (i.e., an occurrence of a progressive award contribution event), the issuer financial institution server communicates the approved amount of the purchase to the progressive award server 210. The progressive award server then contributes a determined amount to the maintained progressive award pool, wherein the determined amount is based on the approved amount of the purchase and the purchase contribution rate associated with the applicable rewards program. For example, if a consumer purchases $100 worth of goods using a credit card associated with a 1% rewards program (i.e., a 1% purchase contribution rate) at a point-of-sale terminal, the progressive award server contributes $1 to a progressive award pool associated with each of the credit cards participating in the reward program.

In one embodiment, the purchase contribution rate represents the entire benefit of the rewards program. In another embodiment, the purchase contribution rate is part, but not all, of the reward program benefits. In this embodiment, a rewards program includes both a purchase contribution rate and a reward earning rate. For example, a credit card or debit card with a reward total of 2% of the purchase price of a qualifying good and/or service includes contributing 1% of the purchase price of a qualifying good and/or service to a progressive award pool and providing the customer 1% cash back of the purchase price of the qualifying good and/or service.

In another embodiment, in addition to or alternatively from the system contributing to a progressive award pool part of the approved purchase price of a qualifying purchase made using a customer's credit card, the system contributes to the progressive award pool part of an amount deposited onto a pre-paid debit card. In this embodiment, the consumer is still provided one or more opportunities to win the progressive award (in association with the loading of funds onto the pre-paid debit card) while the retail establishment avoids having to pay per-purchase transaction fees associated with each of the transactions made using the pre-paid debit card.

Following the contribution of an amount to the progressive award pool, the progressive award server determines if a progressive award triggering event occurred in association with approved purchase as indicated in diamond 106. The progressive award triggering event of this illustrated embodiment is a mystery event whereby the system does not provide any apparent reasons to the consumers for a progressive award triggering event to occur. In these embodiments, such determinations are not triggered by an event (beyond the purchase of goods and/or services) displayed to the consumer and the progressive award triggering event occurs without any explanation or alternatively with simple explanations.

In certain embodiments, the progressive award triggering event is based on an amount of the maintained progressive award pool. In this embodiment, the progressive award server determines if an amount of the progressive award pool reaches or exceeds a threshold amount, such as an amount randomly determined from a value range. Upon the amount of the progressive award pool reaching or exceeding the threshold amount, the progressive award server determines that the progressive award triggering event has occurred in association with a purchase made, using a financial instrument, such as a credit card or a debit card, associated with a financial account enrolled in the rewards program.

In another embodiment, a progressive award triggering event occurs based on time. In this embodiment, a time is set, such as via the random selection of a point in time within a designated period of time from the current point in time, for when a progressive award triggering event will occur. When that set time has elapsed, the progressive award server determines that the progressive award triggering event has occurred in association with a purchase made at or around that point in time, using a financial instrument, such as a credit card or debit card, associated with a financial account enrolled in the rewards program. For example, the progressive award server determines that the first purchase made, after a randomly determined point in time has been reached, using a financial instrument, such as a credit card or a debit card, associated with a financial account enrolled in the rewards program is associated with the progressive award triggering event.

In another embodiment, a progressive award triggering event is based on an amount of the maintained progressive award pool reaching or exceeding a threshold amount and a set point in time having been reached. In this embodiment, upon the amount of the progressive award pool reaching or exceeding the threshold amount after a set point in time, the progressive award server determines that the progressive award triggering event has occurred in association with a purchase made, using a financial instrument, such as a credit card or debit card, associated with a financial account enrolled in the rewards program. In this embodiment, upon the amount of the progressive award pool reaching or exceeding the threshold amount before a set point in time has been reached, then the progressive award server waits for that point in time such that when that set time has been reached, the progressive award server determines that the progressive award triggering event has occurred in association with a purchase made at or around that point in time, using a financial instrument, such as a credit card or debit card, associated with a financial account enrolled in the rewards program.

In another alternative embodiment, a progressive award triggering event occurs based on a predefined variable reaching a defined parameter threshold. In different embodiments, the predefined parameter thresholds include a length of time, a length of time after a certain amount has been contributed to the progressive award pool, a number of different credit cards used, a number of different participating consumers, or any other parameter that defines a suitable threshold. For example, when a threshold quantity of transactions, such as a randomly determined quantity of purchases have occurred by customers using a financial instrument, such as a credit card or debit card, associated with a financial account enrolled in the rewards program, the progressive award server determines that a progressive award triggering event has occurred. In this example, the progressive award server determines that the purchase made using a financial instrument, such as a credit card or debit card, associated with a financial account enrolled in the rewards program which caused the tracked quantity of transactions to reach the threshold quantity of transactions is associated with the progressive award triggering event.

In another alternative embodiment, a progressive award triggering event occurs based upon defined eligibility parameters associated with one or more individual customers. For example, when the one or more individual customers satisfy the eligibility parameters, such as make a randomly determined number of transactions using their credits cards which are enrolled in the rewards program, the progressive award server selects the next purchase made using a credit card enrolled in the rewards program (regardless of if that purchase is associated with the one or more individual consumers) and determines that the progressive award triggering event occurs in association with that next purchase.

In another alternative embodiment, a progressive award triggering event occurs based on a determination of if any numbers allotted to a transaction match a randomly selected number. In this embodiment, upon the progressive award server contributing to the progressive award based on an approved purchase, the progressive award server selects a random number from a range of numbers. In this embodiment, the progressive award server also allocates the first N numbers in the range, where N is the amount of the approved purchase. The progressive award server then compares the randomly selected number with the numbers allocated to the approved purchase and if a match occurs, a progressive award triggering event occurs in association with the approved purchase.

It should be appreciated that any suitable manner of causing a progressive award triggering event to occur may be implemented in accordance with the system and method disclosed herein. It should be further appreciated that any of the above-described progressive award triggering events may be combined in one or more different embodiments.

Returning to FIG. 1, if the progressive award server determines that a progressive award triggering event does not occur in association with the approved purchase, the progressive award server awaits for another occurrence of the progressive award pool contribution event associated with a financial account associated with the maintained progressive award pool as described above and indicated in block 104. For example, if the contribution to the progressive award pool associated with the approved purchase did not cause progressive award pool to increment to the threshold value associated with the progressive award triggering event, the progressive award server awaits for another qualifying purchase to cause another contribution to the progressive award pool as described herein.

On the other hand, if the progressive award server determines that a progressive award triggering event occurred in association with the approved purchase, the progressive award server determines the amount of the progressive award and proceeds to reset the progressive award pool to a reset value associated with the progressive award pool as indicated in block 108. Following this reset of the progressive award pool, the system notifies the customer that they are the winner of a progressive award associated with their approved purchase as indicated in block 110.

Figure 3A:
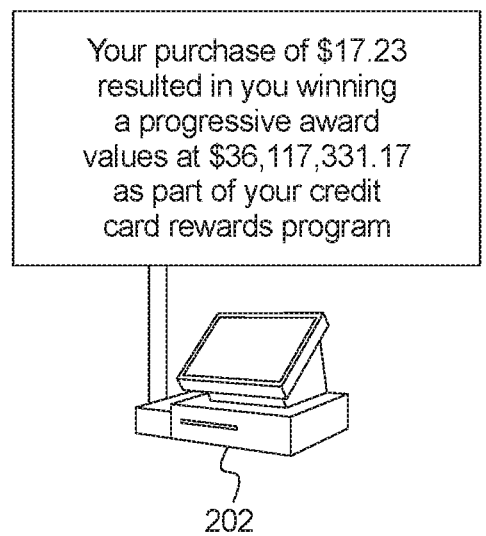
FIGS. 3A, 3B and 3C are example graphical user interfaces displayed in connection with the system disclosed herein.

In one embodiment, the progressive award server communicates data to the point-of-sale terminal (through the issuer financial institution server and the banking network server) which displays one or more progressive award win messages to the consumer. For example, as seen in FIG. 3A, the point-of-sale terminal displays a message informing the consumer that they have won a progressive award valued at $36,117,331.17. In another embodiment, the progressive award server additionally or alternatively communicates data to a signage server which communicates one or more progressive award win messages to one or more signs or display devices associated with the point-of-sale terminal.

Figure 3B:
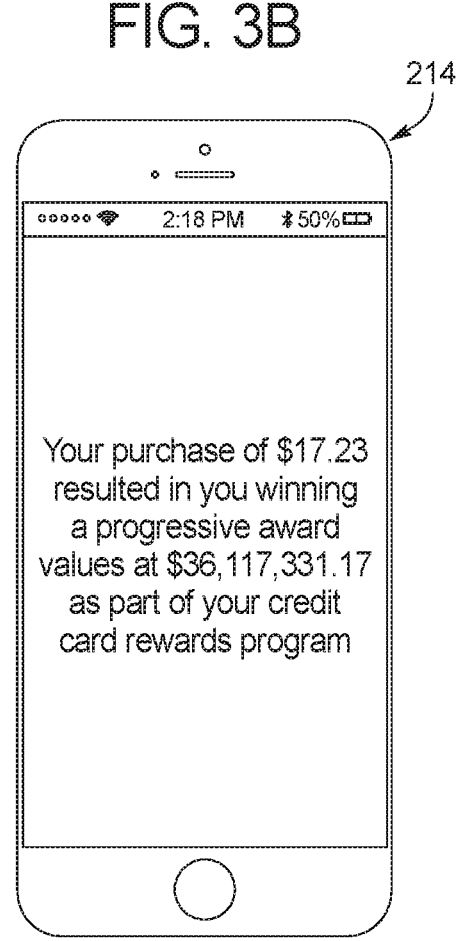

In another embodiment, as seen in FIG. 2A, the progressive award server additionally or alternatively communicates data to a notification server 212 which communicates one or more progressive award win messages to the consumer in any suitable manner, such as through telephone, e-mail, SMS or text messages, banner messages in mobile device application, social media postings, website postings or any other suitable medium. For example, as seen in FIGS. 2A and 3B, the notification server sends an SMS message to the customer's mobile device 214 which displays a message that they have won a progressive award valued at $36,117,331.17. It should be appreciated that while the notification of the benefit, such as a progressive award, is illustrated as being conveyed via a mobile device, in various embodiments, the notification of the benefit may be conveyed via any suitable devices, such as one or more display devices (i.e., overhead displays at a retail location), and/or one or more audio devices (i.e., a retail location speaker system).

In addition to notifying the customer that they have won the progressive award in association with the approved purchase using a financial instrument, such as a credit card or a debit account, associated with a financial account enrolled in the rewards program, the system causes the determined progressive award to be provided to the consumer as indicated in block 112 of FIG. 1. In certain embodiments, the progressive award server transfers data associated with an amount of funds of the progressive award to the issuer financial institution server. The issuer financial institution server then proceeds to provide the customer the amount of funds of the progressive award via issuing the customer the amount of the progressive award or crediting the customer's account with the amount of the progressive award.

In certain embodiments, as described above, upon a determination that a consumer has won a progressive award in association with a qualifying purchase, the system notifies the consumer and funds one or more consumer accounts with the progressive award. In certain embodiments, the system requires the consumer to take one or more actions to be provided the progressive award (which the system has already determined the consumer has won). In certain of these embodiments, the system notifies the consumer that they won the progressive award via the play of one or more games. In these embodiments, in association with the qualifying purchase, the system causes one or more game entries, such as tickets or ticket codes, to be provided to the customer. In certain embodiments, the point-of-sale terminal where the qualifying purchase occurred prints one or more game entries for the customer. In certain other embodiments, the system, such as a game entry engine which stores the game entries and any awards associated with such game entries, communicates one or more game entries (or a notification regarding a quantity of accumulated game entries) to the consumer in any suitable manner, such as through telephone, e-mail, SMS or text messages, a banner message in a mobile device application of a mobile device, a social media posting, a website posting, or any other suitable medium.

Figure 2B:
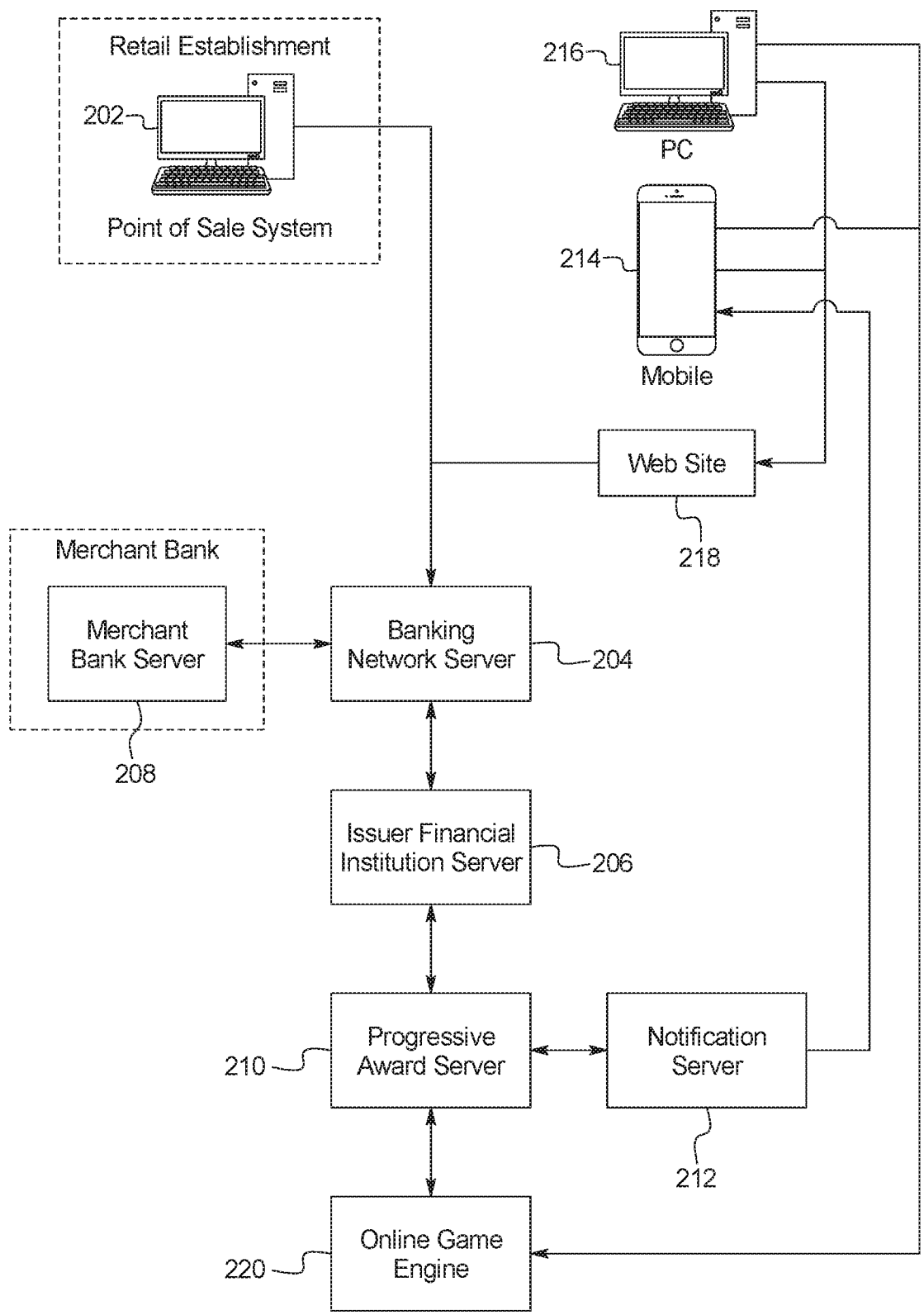
Figure 3C:
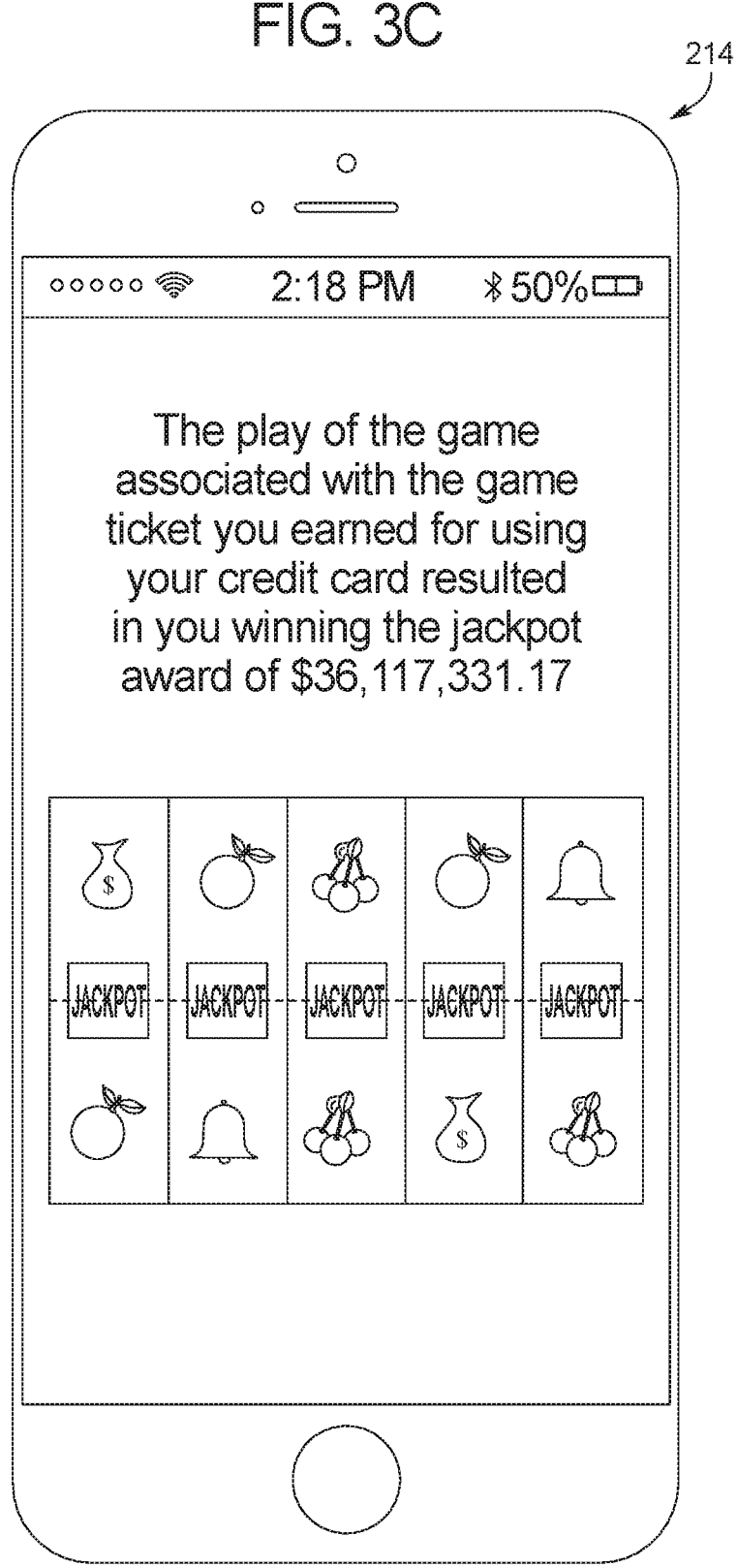

In operation, following the accumulation of one or more game entries, the customer redeems the game entry to view a play of a game. Specifically, the customer plays one or more plays of one or more games in association with the redemption of a quantity of game entries wherein an available award for the play of the game is winning the progressive award. For example, as seen in FIG. 2B, if a consumer is required to play a game to determine if they've won the progressive award associated with the reward program, the consumer redeems one or more game entries, over a suitable wired or wireless data network, using a personal gaming device (such as a mobile device 214, a desktop computer 216, laptop computer, tablet computer or computing device, personal digital assistant) to play an online slot game (accessed via a website 218, via an application executed on the customer's mobile device or via a service window of an electronic gaming machine) facilitated by an online game engine 220. In these embodiments, if the displayed game outcome is associated with the progressive award, the customer is informed of the progressive award win (as seen in FIG. 3C) and the amount of the progressive award is deposited into the customer's credit card account (or sent to the consumer via other suitable payment avenues, such as an electronic payment, or as a physical check).

In certain embodiments, the system enables the customer to play the game to determine whether or not they won the progressive award. In certain other embodiments, the system enables (or even requires) the customer to make one or more inputs in association with the play of the game to determine whether or not they won the progressive award. For example, the system employs a play of a skill-based game wherein the customer is required to make one or more correct skill inputs (i.e., quantifiable inputs which tend to measure one or more aspects of the customer's skill), such as passing a level of a skill-based game, in association with the redemption of a game entry associated with winning a progressive award. In different embodiments, skill includes one or more of: (i) physical skill, such as, but not limited to: timing, aim, physical strength or any combination thereof which is quantifiable by zero, one or more inputs made; (ii) mental skill (i.e., knowledge, reasoning, and/or strategy) which is quantifiable by one or more inputs made (or the lack of any inputs made); and (iii) any other type of skill which is quantifiable by one or more inputs made (or the lack of any inputs made).

In various embodiments, the customer utilizes one or more skill input devices to make one or more quantifiable skill inputs. Examples of skill input devices include, but are not limited to: mobile devices, such as a personal gaming device (as described below), joysticks, buttons, a mouse or a plurality of mice, one or more trackballs, one or more pointing devices, one or more bodily motion trackers such as motion sensing devices for human-computer interaction, touchpads, touchscreens, one or more controllers with: (1) one or more motion sensing devices, (2) one or more proximity sensing devices, (3) one or more force sensing devices (transducers), (4) one or more accelerometers, or any other suitable skill input devices. In these embodiments, by making one or more quantifiable skill inputs, the customer manipulates, influences or otherwise controls one or more aspects of the skill-based game. In certain such embodiments, the system employs one or more physics engines in association with the skill inputs. In various embodiments, the skill-based game is any game, including but not limited to: a shooting simulation game, a racing game, a pinball game, a maze or trail game, a collection game, and/or a coin-pusher game.

In different embodiments, the game played in association with a redeemed game entry is any suitable game including, but not limited to: a play of any suitable slot game; a play of any suitable wheel game; a play of any suitable card game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; and/or a play of any suitable group game.

It should be appreciated that the game entry associated with winning the progressive award is determined in association with the occurrence of the progressive award triggering event (and not during any play of any game associated with a redemption of one or more game entries) such that playing the game functions purely as a delivery mechanism to inform the consumer whether or not they won the progressive award. It should be further appreciated that in certain embodiments, game entries may be redeemed in association with one or more activities beyond making a qualified purchase with an eligible financial account. In one such embodiment, game entries may be obtained by sending a self-addressed stamped envelope to a mailing address to the rewards program administrator. In this embodiment, the rewards program administrator may then send one or more game entries per self-addressed stamped envelope, wherein such game entries are redeemable as described above to determine whether or not they are associated with the progressive award. In another such embodiment, game entries may be obtained via requiring the consumer to show up to a physical location to obtain one or more game entries and/or fill out a survey to obtain one or more game entries.

In certain embodiments, based on the historical spending levels of certain consumers, the system enables a plurality of game entries to be redeemed at the same time in association with a play of a game, wherein the total winnings from the game play represents the total winnings from each of the redeemed game entries. For example, since, as described above, the average spend per month on a credit card account associated with a rewards program is $890 per consumer, assuming each $1 spent earns the customer a game entry, rather than requiring the customer to redeem, on average, 890 game entries a month, the system enables a customer to redeem multiple game entries in association with one or more plays of the game.

In certain embodiments wherein the customer is not provided the progressive award until the customer redeems a game entry associated with the progressive award, certain timing discrepancies may occur due to the customer's delayed redemption of one or more game entries. In one embodiment, if the winning consumer has not claimed the progressive award via redeeming a game entry associated with the progressive award, then the system directs contributions into a rollover or escrow pool. In this embodiment, if the customer redeems the game entry associated with the progressive award within a designated period of time, such as by a certain date, then the system funds the progressive award from the contributions rolled over into the escrow pool. On the other hand, if the consumer does not redeem the game entry associated with the progressive award within the designated period of time, such as by the certain date, then the system rolls the unclaimed progressive award into the next progressive award pool. In one such embodiment, the customer may still redeem the game entry associated with the progressive award and collect the progressive award from the next progressive award pool. In another such embodiment, part or all of the unclaimed progressive award is made available to another customer in association with another qualifying purchase. In another such embodiment, part or all of the unclaimed progressive award is returned to the company or companies managing the rewards program. In these embodiments wherein the unclaimed progressive award is provided to another consumer and/or the company managing the rewards program, the system notifies the consumers that all of their existing game entries are no longer eligible, and that new game entries are required to be eligible to win the next progressive pool award amount.

In another embodiment wherein a consumer has won a progressive award, but that customer has not claimed or redeemed the game entry associated with the progressive award, regardless of the progressive award not yet being provided, the system resets the progressive award pool to a reset value and begins taking contributions from new qualifying purchases. In another embodiment wherein a consumer has won a progressive award, but that customer has not claimed or redeemed the game entry associated with the progressive award, the system waits until the progressive award has been claimed to reset the progressive award pool to a reset value, wherein contributions from new qualifying purchases are directed to another progressive award pool.

In another embodiment, the system enables a customer to redeem prior accumulated credit card account points for game entries. That is, to incentive a customer to join the rewards program disclosed herein, the system enables a customer to transfer a quantity of points associated with one financial account, such as airline miles or points otherwise redeemable for goods and/or services, to another financial account wherein the transferred quantity of points are redeemed for one or more game entries.

In certain embodiments, the system associates a qualifying purchase with one rewards program to potentially win one progressive award. In other embodiments, the system associates a qualifying purchase with a plurality of rewards programs to potentially win a plurality of progressive awards. For example, for a credit card account with a 2% rewards rate, the system contributes 1% of the purchase price of the qualifying good and/or service to a first maintained progressive award pool and also contributes 1% of the purchase price of the qualifying good and/or service to a second, different maintained progressive award pool.

In certain embodiments, a progressive award pool is associated with a plurality of progressive award triggering events which occur. For example, the system associates a progressive award pool with a plurality of randomly selected threshold values wherein an award is provided to a customer each time the progressive award pool increments to one of the randomly selected threshold values. In this example, while the system provides a customer a progressive award when the progressive award pool increments to a designated one of the randomly selected threshold values, such as the highest threshold value, the system provides the customer one or more non-progressive awards (such as a static prize amount, a non-cash prize, such as a vacations, a cars, or items of value at partner gaming establishments, such as free play, points, or promotional credits) when the progressive award pool increments to a non-designated randomly selected threshold value.

In different embodiments, the various components of the system, such as the point-of-sale terminal, the banking network server, the issuer financial institution server, the progressive award server, the notification server, the online game engine, and/or the game entry engine, each includes one or more interfaces for communicating with each other utilizing one or more wired connections (such as, but not limited to: a conventional phone line or other data transmission line, a digital subscriber line (DSL), a T-1 line, a coaxial cable, a fiber optic cable) and/or one or more wireless communication protocols (such as, but not limited to: Bluetooth™ Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol)).

In various embodiments, one or more above-described components of the system, such as one or more of the point-of-sale terminal, the banking network server, the issuer financial institution server, the progressive award server, the notification server, the online game engine, and/or the game entry engine each includes at least one processor. The at least one processor of these devices is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source via a communication interface; (2) converting signals read by an interface to a format corresponding to that used by software or memory of that device; (3) accessing memory to configure or reconfigure parameters in the memory according to received data; (4) communicating with interfaces and zero, one or more peripheral devices (such as input/output devices); and/or (5) controlling zero, one or more peripheral devices.

In various embodiment, one or more above-described components of the system, such as one or more of the point-of-sale terminal, the banking network server, the issuer financial institution server, the progressive award server, the notification server, the online game engine, and/or the game entry engine each also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solidstate memory, etc.); (3) unalterable memory (e.g., EPROMs); (4) read-only memory; and/or (5) a secondary memory storage device, such as a non-volatile memory device, configured to store software related information. Any other suitable magnetic, optical, and/or semiconductor memory may operate in conjunction with these devices.

The at least one memory device is configured to store, for example: (1) configuration software, such as all the parameters and settings for that device; (2) associations between configuration indicia received and one or more parameters and settings; (3) communication protocols configured to enable the at least one processor to communicate with zero, one or more peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the device to communicate with local and non-local devices using such protocols. In one implementation, one or more of such devices communicate with other devices using a serial communication protocol.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of one or more above-described components of the system, such as one or more of the point-of-sale terminal, the banking network server, the issuer financial institution server, the progressive award server, the notification server, the online game engine, and/or the game entry engine to control that device. The at least one memory device also stores other operating data, such as image data, event data, input data, random number generators or pseudo-random number generators, and/or applicable rules that relate to the operation of such devices. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator uses such a removable memory device to implement at least part of the present disclosure. In other embodiments, part or all of the program code and/or the operating data is downloaded to the at least one memory device through any suitable data network described above (such as an Internet or intranet).

The at least one memory device also stores a plurality of device drivers. Examples of different types of device drivers include device drivers for components of one or more of the point-of-sale terminal, banking network server, issuer financial institution server, progressive award server, notification server, online game engine, game entry engine, and device drivers for the peripheral components. Typically, the device drivers utilize various communication protocols that enable communication with a particular physical device. The device driver abstracts the hardware implementation of that device. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the one or more above-described components of the system, such as one or more of the point-of-sale terminal, the banking network server, the issuer financial institution server, the progressive award server, the notification server, the online game engine, and/or the game entry engine loads the new device driver from the at least one memory device to enable communication with the new device.

In certain embodiments, the software units stored in the at least one memory device can be upgraded as needed. For instance, when the at least one memory device is a hard drive, new options, new parameters, new settings for existing parameters, new settings for new parameters, new device drivers, and new communication protocols can be uploaded to the at least one memory device from one or more above-described components of the system, such as one or more of the point-of-sale terminal, the banking network server, the issuer financial institution server, the progressive award server, the notification server, the online game engine, and/or the game entry engine or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components and/or information, such as hardware components, software components, firmware components, peripheral device components, user input device components, information received from one or more user input devices, information stored in the at least one memory device, etc.

In certain embodiments, the peripheral devices include several device interfaces, such as: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; and (13) at least one information filtering module.

The at least one output device includes at least one display device configured to display any suitable information associated with the rewards program disclosed herein. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, the display device includes a touch-screen with an associated touch-screen controller. The display devices may be of any suitable sizes, shapes, and configurations.

In certain embodiments, the at least one output device is a sound generating device controlled by one or more sound cards. In one such embodiment, the sound generating device includes one or more speakers or other sound generating hardware and/or software configured to generate sounds.

The at least one input device may include any suitable device that enables an input signal to be produced and received by the at least one processor.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices. In one embodiment, a user input device docking region is provided, and includes a power distribution component that is configured to recharge a user input device without requiring metal-to-metal contact. In one embodiment, the at least one power distribution component is configured to distribute power to one or more internal components, such as one or more rechargeable power sources (e.g., rechargeable batteries).

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity; detecting the presence and/or identity of various persons (e.g., customers, retail establishment employees, etc.), devices (e.g., user input devices), and/or systems within a predetermined proximity.

The at least one data preservation component is configured to detect or sense one or more events and/or conditions that, for example, may result in damage to the one or more above-described components of the system, such as one or more of the point-of-sale terminal, the banking network server, the issuer financial institution server, the progressive award server, the notification server, the online game engine, and/or the game entry engine and/or that may result in loss of information. Additionally, the data preservation system may be operable to initiate one or more appropriate action(s) in response to the detection of such events/conditions.

The at least one motion/gesture analysis and interpretation component is configured to analyze and/or interpret information relating to detected movements and/or gestures to determine appropriate input information relating to the detected movements and/or gestures. For example, in one embodiment, the at least one motion/gesture analysis and interpretation component is configured to perform one or more of the following functions: analyze the detected gross motion or gestures of a customer; interpret the customer's motion or gestures to identify instructions or input from the customer. In other embodiments, at least a portion of these additional functions may be implemented at a remote system or device.

The at least one portable power source enables the one or more above-described components of the system, such as one or more of the point-of-sale terminal, the banking network server, the issuer financial institution server, the progressive award server, the notification server, the online game engine, and/or the game entry engine to operate in a mobile environment. For example, in one embodiment, the point-of-sale terminal includes one or more rechargeable batteries.

The at least one geolocation module is configured to acquire geolocation information from one or more remote sources and use the acquired geolocation information to determine information relating to a relative and/or absolute position of the one or more above-described components of the system, such as one or more of the point-of-sale terminal, the banking network server, the issuer financial institution server, the progressive award server, the notification server, the online game engine, and/or the game entry engine. For example, in one implementation, the at least one geolocation module is configured to receive GPS signal information for use in determining the position or location of a point-of-sale terminal. In another example, the at least one geolocation module is configured to receive multiple wireless signals from multiple remote devices and use the signal information to compute position/location information relating to the position or location of the point-of-sale terminal.

The at least one information filtering module is configured to perform filtering (e.g., based on specified criteria) of selected information to be displayed at one or more displays.

In various embodiments, the one or more above-described components of the system, such as one or more of the point-of-sale terminal, the banking network server, the issuer financial institution server, the progressive award server, the notification server, the online game engine, and/or the game entry engine includes a plurality of communication ports configured to enable the at least one processor to communicate with and to operate with external peripherals, such as: accelerometers, arcade sticks, bar code readers, bill validators, biometric input devices, button panels, card readers, display screens or other displays or video sources, expansion buses, information panels, keypads, lights, mass storage devices, microphones, motion sensors, motors, printers, SCSI ports, solenoids, speakers, thumbsticks, ticket readers, touch screens, trackballs, touchpads, wheels, and wireless communication devices.

As indicated above, in certain embodiments, a customer redeems one or more game entries via a play of an online game. In these embodiments, the system includes one or more servers configured to communicate with a personal gaming device—such as a smartphone, a tablet computer, a desktop computer, or a laptop computer—to enable web-based game play using the personal gaming device. In various embodiments, the customer must first access a gaming website via an Internet browser of the personal gaming device or execute an application (commonly called an "app") installed on the personal gaming device before the customer can use the personal gaming device to redeem one or more game entries via participating in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the customer before enabling game play on the personal gaming device to redeem one or more game entries. In these embodiments, the customer must identify herself to the one or more servers, such as by inputting the customer's unique username and password combination (or in any other manners described above).

Once identified, the one or more servers enable the customer to play one or more online games in association with the redemption of one or more game entries to determine whether or not the customer won the progressive award. In certain embodiments, if the customer won the progressive award, the one or more servers enable the customer to initiate an electronic funds transfer to transfer funds to one or more accounts associated with the customer.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area.

In certain embodiments, as indicated above, the system is configured to notify a customer regarding winning a progressive award (or potentially winning a progressive award) in association with a qualifying purchase via one or more social network postings. In these embodiments, the system is configured to communicate with a social network server that hosts or partially hosts a social networking website via a data network (such as the Internet) to integrate the rewards program disclosed herein with the customer's social networking account. This enables the system to send certain information to the social network server that the social network server can use to create content (such as text, an image, and/or a video) and post it to the customer's wall, newsfeed, or similar area of the social networking website accessible by the customer's connections (and in certain cases the public) such that the customer's connections can view that information. This also enables the system to receive certain information from the social network server, such as the customer's likes or dislikes or the customer's list of connections. In certain embodiments, the system enables the customer to link the customer's customer account to the customer's social networking account(s). This enables the system to, once it identifies the customer and initiates a gaming session to redeem game entries (such as via the customer logging in to a website (or an application) on the customer's personal gaming device, link that gaming session to the customer's social networking account(s). In other embodiments, the system enables the customer to link the customer's social networking account(s) to individual gaming sessions when desired by providing the required login information.

For instance, in one embodiment, if a customer wins a particular award (e.g., a progressive award or a jackpot award associated with a qualifying purchase), the system sends information about the award to the social network server to enable the server to create associated content (such as a screenshot of the award) and to post that content to the customer's wall (or other suitable area) of the social networking website for the customer's connections to see (and to entice them to join the rewards program).

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a processor; and
a memory device which stores a plurality of instructions, which when executed by the processor, cause the processor to:
maintain a progressive award pool,
randomly determine a progressive award triggering event associated with the progressive award pool,
responsive to receiving data of an approved purchase associated with a financial account maintained by a financial institution, increment the progressive award pool based on a purchase contribution rate associated with the progressive award pool and an amount of the approved purchase, and
responsive to the approved purchase being associated with an occurrence of the randomly determined progressive award triggering event:
determine, based on the incremented progressive award pool, an amount of a progressive award, and
cause the amount of the progressive award to be provided to a customer associated with the financial account.

2. The system of claim 1, wherein the randomly determined progressive award triggering event occurs when the progressive award pool has incremented to at least a randomly determined threshold value.

3. The system of claim 1, wherein the randomly determined progressive award triggering event occurs responsive to receiving data of the approved purchase within a period of time following a randomly determined point in time.

4. The system of claim 1, wherein the financial account is selected from the group consisting of: a credit card account, a debit card account, and a pre-paid debit card account.

5. The system of claim 1, wherein when executed by the processor responsive to the approved purchase being associated with the occurrence of the randomly determined progressive award triggering event, the instructions cause the processor to communicate fund data associated with the amount of the progressive award to the financial account.

6. The system of claim 1, wherein when executed by the processor responsive to the approved purchase being associated with the occurrence of the randomly determined progressive award triggering event, the instructions cause the processor to communicate data which results in a display device displaying an indication of the amount of the progressive award to be provided to the customer associated with the financial account.

7. The system of claim 6, wherein the display device is selected from the group consisting of: a display device of a point-of-sale terminal associated with the approved purchase, a display device adjacent to the point-of-sale terminal associated with the approved purchase, and a display device of a mobile device.

8. The system of claim 6, wherein the displayed indication is selected from the group consisting of: an e-mail, a text message, a banner message in a mobile device application of a mobile device, a social media posting, and a website posting.

9. A system comprising:
a processor; and
a memory device which stores a plurality of instructions, which when executed by the processor, cause the processor to:
maintain a progressive award pool,
randomly determine a progressive award triggering event associated with the progressive award pool,
responsive to receiving data of an approved purchase associated with a financial account maintained by a financial institution, increment the progressive award pool based on a purchase contribution rate associated with the progressive award pool and an amount of the approved purchase, and
responsive to the approved purchase being associated with an occurrence of the randomly determined progressive award triggering event:
determine, based on the incremented progressive award pool, an amount of a progressive award,
associate a game entry with the determined amount of the progressive award, and
cause a customer associated with the approved purchase to be provided the game entry.

10. The system of claim 9, wherein the randomly determined progressive award triggering event occurs when the progressive award pool has incremented to at least a randomly determined threshold value.

11. The system of claim 9, wherein the randomly determined progressive award triggering event occurs responsive to receiving data of the approved purchase within a period of time following a randomly determined point in time.

12. The system of claim 9, wherein the financial account is selected from the group consisting of: a credit card account, a debit card account, and a pre-paid debit card account.

13. The system of claim 9, wherein when executed by the processor responsive to a redemption of the provided game entry, the instructions cause the processor to cause the amount of the progressive award to be provided to the customer.

14. The system of claim 13, wherein then redemption of the provided game entry occurs in association with a play of a game.

15. The system of claim 14, wherein the play of the game occurs remote from a point-of-sale terminal associated with the approved purchase.

16. The system of claim 9, wherein when executed by the processor responsive to a game entry accumulation event which occurs independent of any approved purchase, the instructions cause the processor to generate another game entry.

17. A system comprising:
a processor; and
a memory device which stores a plurality of instructions, which when executed by the processor, cause the processor to:
maintain a progressive award pool associated with a plurality of credit card accounts, randomly determine a progressive award triggering event associated with the progressive award pool, responsive to receiving data of an approved retail purchase associated with one of the credit card accounts occurring at a point-of-sale terminal, increment the progressive award pool based on a purchase contribution rate associated with the progressive award pool and an amount of the approved retail purchase, and responsive to the approved retail purchase being associated with an occurrence of the randomly determined progressive award triggering event:
  determine, based on the incremented progressive award pool, an amount of a progressive award,
  communicate data which results in a display device associated with the point-of-sale terminal displaying the amount of the progressive award, and
  communicate fund transfer data which results in the amount of the progressive award being associated with the credit card account associated with the approved retail purchase.

18. The system of claim 17, wherein the randomly determined progressive award triggering event occurs when the progressive award pool has incremented to at least a randomly determined threshold value.

19. The system of claim 17, wherein the randomly determined progressive award triggering event occurs responsive to receiving data of the approved purchase within a period of time following a randomly determined point in time.

* * * * *